United States Patent
Antoun

(10) Patent No.: US 6,533,509 B1
(45) Date of Patent: Mar. 18, 2003

(54) TOOL HOLDER UNCLAMP MECHANISM FOR A MILLING MACHINE

(76) Inventor: Gregory S. Antoun, P.O. Box 1057, Meadville, PA (US) 16335

( * ) Notice: Subject to any disclaimer, the term of this patent is extended or adjusted under 35 U.S.C. 154(b) by 0 days.

(21) Appl. No.: 09/953,162

(22) Filed: Sep. 17, 2001

(51) Int. Cl.$^7$ .............................. B23C 1/00; B23C 5/26; B23C 5/28
(52) U.S. Cl. .................... 409/233; 409/136; 408/239 R
(58) Field of Search ................................ 409/233, 232, 409/135, 136; 408/239 R, 240

(56) References Cited

U.S. PATENT DOCUMENTS

| | | | |
|---|---|---|---|
| 3,481,248 A | | 12/1969 | Engstrom |
| 3,678,801 A | | 7/1972 | Hague et al. |
| 4,063,488 A | | 12/1977 | Kagerer |
| 4,175,898 A | | 11/1979 | Wood |
| 4,290,720 A | | 9/1981 | Ferreira |
| 4,352,612 A | | 10/1982 | Benatti |
| 4,863,324 A | * | 9/1989 | Blessing ...................... 409/233 |
| 4,884,899 A | | 12/1989 | Schwartzman |
| 4,957,398 A | | 9/1990 | Schneider et al. |
| 4,976,282 A | | 12/1990 | Kubala |
| 5,022,686 A | | 6/1991 | Heel et al. |
| 5,096,347 A | * | 3/1992 | Kumagai et al. ........... 409/233 |
| 5,340,248 A | | 8/1994 | Enbergs |
| 5,577,775 A | | 11/1996 | Pearson et al. |
| 5,617,879 A | | 4/1997 | Kubala |
| 5,669,636 A | | 9/1997 | Kubala |
| 5,707,186 A | * | 1/1998 | Gobell et al. ............... 409/233 |
| 5,743,687 A | | 4/1998 | Ribic et al. |
| 5,782,586 A | * | 7/1998 | Geissler ...................... 409/233 |
| 5,901,643 A | | 5/1999 | Bornhorst |
| 6,029,695 A | | 2/2000 | Logan |
| 6,109,659 A | | 8/2000 | Heidenreich et al. |

FOREIGN PATENT DOCUMENTS

| | | |
|---|---|---|
| CA | 598285 | 5/1960 |
| GB | 859457 | 1/1961 |
| SU | 1579653 | 7/1990 |

* cited by examiner

Primary Examiner—A. L. Wellington
Assistant Examiner—Erica Cadugan
(74) Attorney, Agent, or Firm—Richard C. Litman

(57) ABSTRACT

A tool holder unclamp mechanism for a milling machine eliminates compressive forces upon the coolant seals conventionally installed in integral tool and workpiece coolant systems for such machines. The present mechanism is particularly well adapted for installation in Haas and similar milling machines, and comprises a conventional Deublin union modified for installation atop the drawbar actuating piston of the machine, with the drawbar actuating mechanism imparting its forces peripherally around the concentric Deublin union. The Deublin union includes an internal coolant bypass, thereby eliminating coolant leakage past the conventional seal location and into the spindle bearings. As the carbide coolant seals between non-rotating and rotating components are contained within the Deublin union, no impact forces are imparted to those seals during tool change operations when the present invention is installed in the machine, thereby greatly prolonging seal life and reducing seal and spindle bearing replacement.

19 Claims, 3 Drawing Sheets

TOOL HOLDER UNCLAMP MECHANISM FOR A MILLING MACHINE

BACKGROUND OF THE INVENTION

1. Field of the Invention

The present invention relates generally to powered machine tools and equipment, and more specifically to a modification for a Haas mill vertical milling machine, permitting considerably higher coolant pressures to be used and precluding or greatly reducing damage and wear to the carbide coolant seals within the machine.

2. Description of the Related Art

In commercial machine shops and related operations, the rate at which machining can be performed on a given workpiece obviously has a significant bearing upon productivity. High rates of machining, and correspondingly high productivity, are obviously desirable in such operations. Such machines are typically configured for rapid and efficient interchange of cutting elements or tooling, in order to minimize down time and increase productivity. An example of such is the Haas overhead milling machine, with its pneumatically operated tool unclamp mechanism, which drives the drawbar downwardly to release the tool holder from its tapered chuck or receptacle at the end of the spindle.

This system utilizes a relatively large diameter, short stroke plate which is driven downwardly by pneumatic pressure within a wide and relatively short cylinder. This plate engages a piston, with the piston contacting the upper end of the drawbar to drive the drawbar downwardly through the spindle. In such mills, the piston and drawbar are separated by a pair of coolant seal inserts, with the non-rotating piston seal insert contacting the drawbar seal insert during tool change and other operations.

The rate of machining of the workpiece is limited by several factors, such as the type and hardness of the material being machined, the specific machining operation, cutting speeds, tolerances and surface finish, etc. However, another limiting factor is the delivery of coolant to the workpiece as it is being machined. Automated powered machine tools and equipment almost universally provide for some form of coolant and/or lubricant to be delivered to the cutting element as it engages the workpiece being machined. Coolant can be delivered by an external coolant delivery system, or by manufacturing the machine with internal, through spindle coolant delivery passages. Where internal coolant delivery is provided, the coolant delivery passages and orifices are of fixed size in any given machine, and cannot be practicably enlarged for greater coolant flow. Thus, the limiting factor for coolant delivery is the pressure at which the coolant is being delivered.

Heretofore, coolant delivery in a conventional overhead milling machine has been limited to about 300 pounds per square inch (psi), with this limitation often being set by the internal seal inserts noted further above between the conventional non-rotating tool change piston and the upper end of the rotating drawbar to which the tool holder is removably secured. These inserts are customarily formed of an extremely hard carbide material, with their mating faces being machined to an extremely close tolerance. The mating faces of the two seal inserts are the only sealing means provided; no other elastomer or other seals are provided between the drawbar piston and the drawbar, to contain the coolant within the concentric drawbar passage.

This system has its disadvantages, in that the two inserts also suffer from impact forces when the piston is driven downwardly to force the drawbar down for tool holder release. The impact forces can cause the extremely hard and somewhat brittle carbide inserts to crack and chip, which leads to coolant leakage during operation of the mill. In a conventionally configured Haas mill, this coolant leakage often travels into the spindle bearings and washes out the lubricants therein, thereby ruining the bearings and requiring costly repair. Also, the conventional Haas mill seal inserts are in constant contact with one another, whether coolant is passing therethrough or not. When the mill is run without coolant, the friction between these seal inserts can produce considerable heat, which can deform the end of the drawbar and lead to further cracking and/or deformation of the seal inserts.

Accordingly, a need will be seen for a tool holder unclamp mechanism for a milling machine, particularly for the Haas mill type machine, which obviates the above problems. The present invention essentially comprises the incorporation of a rotary union at the upper portion of the tooling unclamp piston above the drawbar, with the union containing the seal inserts between the lower end of the piston and the upper end of the drawbar. The union permits relatively high coolant pressures to be run therethrough, and thus throughout the machine. The union includes means for separating the two seal inserts during periods where coolant is not being run through the system, thereby precluding frictional wear and heating of the two seal inserts against one another. The present invention also obviates impact forces between the two inserts during tool holder changes, by applying all compressive forces concentrically around the union, piston, and seal inserts to a collar or coupling which attaches to the upper end of the drawbar. When coolant is run through the system, any leakage from the seal inserts is contained within the union and thence passed from the machine, thereby protecting the spindle bearings of the mill. The present invention includes further advantages as well, such as tapering the walls of the pneumatically actuated center plate to preclude binding or "cocking" of the plate within its cylinder during tool changeover operations.

A discussion of the related art of which the present inventor is aware, and its differences and distinctions from the present invention, is provided below.

U.S. Pat. No. 3,481,248 issued on Dec. 2, 1969 to Donald F. Engstrom, titled "Drawbar For Machine Tools," describes a tool unclamp drawbar assembly for a milling machine or the like. The Engstrom assembly utilizes pneumatic pressure both to extend and to retract the drawbar for tool release, using a concentric air impact motor for extending the drawbar and a radially displaced pneumatic motor for retracting the drawbar after a tool change. No disclosure is made of any form of concentric or other coolant passages through the machine, as provided in the mill incorporating the present invention. Moreover, the Engstrom system operates directly against the upper end of the drawbar, rather than applying tool holder release forces around the upper end of the drawbar, as in the present mechanism.

U.S. Pat. No. 3,678,801 issued on Jul. 25, 1972 to Robert Z. Hague et al., titled "Quick Tool Change Mechanism For Machine Tools," describes a system utilizing a relatively wide, flat plate disposed within a mating cylinder concentrically above the drawbar of the machine. The plate includes a central "bolt" having an open center, which fits over the upper end of the drawbar. When the plate is driven downwardly by pneumatic pressure, the "bolt" contacts the end of the drawbar to drive it downwardly to release the tool holder at the lower end thereof. As in the Engstrom assembly discussed above, Hague et al. do not disclose any form of coolant passages in the machine incorporating their invention, and thus do not require any seal inserts, as incorporated in the mill to which the present invention is applied.

U.S. Pat. No. 4,063,488 issued on Dec. 20, 1977 to Franz Kagerer, titled "Tool Chuck," describes a clamping mechanism at the lower end of the drawbar, for clamping and unclamping the upper end of the tool holder within the lower end of the spindle. The Kagerer system has a series of radially disposed keys, which move radially from corresponding slots in the locking head to engage a flange extending from the stem at the upper end of the tool holder. This structure differs from that used with other mills, e.g. the Haas mill to which the present invention is applied, with the Haas mill having a series of ball bearings which engage cooperating receptacles in the locking head and stem of the tool holder. In any event, Kagerer does not disclose any means of actuating the drawbar or providing high pressure coolant through the drawbar and tool holder, as provided by the present invention.

U.S. Pat. No. 4,175,898 issued on Nov. 27, 1979 to Edward H. Wood, titled "Tool Changing Apparatus," describes a mechanism adaptable to a Bridgeport type mill, where the tool holder comprises a collet which is threaded to the lower end of the drawbar and keyed within the lower end of the spindle. The Wood mechanism drives the drawbar downwardly and simultaneously rotates the drawbar, to unscrew the collet from the lower end of the drawbar. The tool holder of the Haas machine, or similar machine to which the present invention is applied, is not threaded to the drawbar, and hence rotation of the drawbar is not desired during tool change. In any event, no disclosure is made of any form of coolant system in the mill of the Wood patent.

U.S. Pat. No. 4,290,720 issued on Sep. 22, 1981 to Roberto J. Ferreira, titled "Quick Self-Release And Reload Tooling Device," describes a tool holder and clamping mechanism having a series of ball bearings which selectively lock into corresponding recesses in the sides of the stem of the tool holder or chuck.

This mechanism is similar to that used in securing the tool holder within a Haas mill. However, Ferreira does not provide a drawbar which continuously retains the tool holder within its tapered lower spindle end, as in the mill to which the present invention is applied. Rather, Ferreira uses a series of spherically ended rods to transmit compressive force to the stem of the tool holder or chuck. Ferreira does not provide any means of transmitting the compressive force around the upper end of the drawbar, as provided by the present invention, as the mechanism of the Ferreira patent does not include any central coolant passage or seals therefor.

U.S. Pat. No. 4,352,612 issued on Oct. 5, 1982 to Edmo Benatti, titled "Tool Fastening Device," describes a mill or similar machine in which the tool holder is secured in the lower end of the spindle by a series of vertically disposed fingers extending from the end of a compression rod which passes axially through the center of the drawbar. The fingers are splayed outwardly to grip the inside of the tool holder, when engaged. The installation of the locking rod within the drawbar precludes any coolant passages concentrically therethrough. Accordingly, there is no disclosure of any seals or circumferential transfer of tool holder release force around the seals, as in the present invention.

U.S. Pat. No. 4,884,899 issued on Dec. 5, 1989 to Everett H. Schwartzman, titled "Resiliently Mounted Fluid Bearing Assembly," describes a hydrostatically or hydrodynamically supported spindle for high speed operations, i. e., in excess of 100,000 rpm, according to the abstract. No coolant passage for tooling is provided through the central shaft of the device, in any of its embodiments. As the Schwartzman device is intended for considerably higher rotational speeds than used in a milling machine or the like, it is not adaptable to a Haas mill or other similar mill. Accordingly, no tool holder or means of releasing such a tool holder, is disclosed by Schwartzman in his patent.

U.S. Pat. No. 4,957,398 issued on Sep. 18, 1990 to Manfred Schneider et al., titled "Two-Section Tool Spindle Having A Channel For Carrying A Pressurized Fluid," describes a mechanized tool spindle having an electric motor disposed generally centrally along the length of the spindle. The spindle includes an "operating rod" disposed concentrically therein, with the rod acting as the drawbar in the mill of the present invention. Axial movement of the rod is provided by a piston and cylinder, but the cylinder drives a hollow rod which is in turn threaded to the operating rod. As the two rods are essentially permanently connected to one another, Schneider et al. do not provide any mating seals therebetween. Thus, the tool holder release force acts through the operating and connecting rods, rather than around these components to protect the seal inserts, as would be the case in the mill of the present invention.

U.S. Pat. No. 4,976,282 issued on Dec. 11, 1990 to Zbignew Kubala, titled "Coolant Union With Fluid Actuated Seal Assembly," describes a fluid joint having a relatively stationary outer shell communicating internally with a rotary shaft extending from one end thereof. The Kubala patent has been assigned to the Deublin Company, which manufactures the device, with the device being known generally as a "Deublin union." The structure of the Deublin union of the Kubala '282 U.S. Patent is incorporated herein by reference. The Deublin union includes non-rotating and rotating seal inserts used between the upper end of the drawbar and the piston to drive the drawbar downwardly in a Haas mill or similar machine. However, the Deublin union of the Kubala '282 U.S. Patent includes a resilient diaphragm which draws the non-rotating seal away from the rotating seal, when coolant fluid pressure is not present. Thus, the only time the two seals are in contact with one another, is when coolant is being forced through the union. It will be noted that some coolant will escape from between the two seal inserts, particularly when coolant flow is initiated and when flow is terminated. Accordingly, a radially disposed coolant relief passage is provided in the side of the Deublin union, to allow coolant to escape therefrom without contaminating the spindle bearings, with a seal provided between the coolant escape cavity and bearings. While such Deublin unions are known, they have not been incorporated with a mill of the Haas mill configuration prior to the present invention, with the present mechanism using such a Deublin union therewith.

U.S. Pat. No. 5,022,686 issued on Jun. 11, 1991 to Helmut Heel et al., titled "Rotating Union For Two Different Fluids," describes a device having two separate fluid passages therethrough. One passage is concentric, with the other being radially offset therefrom and parallel thereto. A pair of "slide rings," which appear to function much the same as the seal inserts used in the conventional Haas mill and Deublin union, are provided within the union of the Heel et al. patent. However, no means is apparent for separating these two seals when no fluid is passing through the union, unlike the Deublin union described further above with its selectively engageable seals. In any event, Heel et al. do not disclose any means of providing drawbar compressive force around their union, as provided by the present invention.

U.S. Pat. No. 5,340,248 issued on Aug. 23, 1994 to Bernhard Enbergs, titled "Mechanical Chuck With Clamp For Pulling Tool Shank To Tightly Clamped Position," describes a chuck or tool holder mechanism wherein the pull rod (drawbar) does not pass completely through the machine to have tensile force applied to the end opposite the tool holder in order to hold the tool holder in place. Rather, the Enbergs mechanism provides a relatively short, flanged tool holder, with a series of pins in a generally conical array being forced against the tool holder flange by a nut when the nut is tightened. Accordingly, no coolant passage is provided through a drawbar which extends through the machine, as in the present invention. Accordingly, Enbergs does not disclose any seal inserts or means for displacing operating forces around such inserts.

U.S. Pat. No. 5,577,775 issued on Nov. 26, 1996 to Dennis G. Pearson et al., titled "Bearingless Coolant Union," describes a union incorporating a stationary and a rotating seal insert, with the two seal inserts bearing against one another, generally as disclosed in the device of the Kubala '282 patent discussed further above. More particularly, Pearson et al. state that their seals are "in permanently contacting relation" (col. 5, line 45) with one another, as in the union of FIG. 1 of Kubala, noted in that patent as prior art. The disadvantages of permanently engaged seal members have been noted further above, and in any event, Pearson et al. make no disclosure of any means of applying a compressive force to a drawbar by structure bypassing the seals within the union, as provided by the present invention.

U.S. Pat. No. 5,617,879 issued on Apr. 8, 1997 to Zbignew Kubala, titled "Sealing Arrangement For A Coolant Union Having A Floating Seal Assembly," describes a union loosely related to the union of the '282 U.S. Patent to the same inventor, discussed further above. The device of the '879 patent differs primarily in that the force for separating the two seals when no coolant pressure is present, is supplied by a spring which applies constant pressure to the nonrotating seal at all times. Otherwise, the same points raised in the discussion further above of the Deublin union of the '282 U.S. Patent, i. e., the lack of incorporation of such a union with a Haas or similar mill, are seen to apply here as well.

U.S. Pat. No. 5,669,636 issued on Sep. 23, 1997 to Zbignew Kubala, titled "Floating Seal Assembly For A Bearingless Coolant Union Having Air Rotation Capability," describes a union which closely resembles the union of the '879 U.S. Patent to the same inventor, discussed immediately above. However, the union of the '636 patent includes a radial port and circumferential chamber for applying air or liquid pressure thereto for balancing the force of corresponding air or liquid applied through a concentric port to the union. A spring is provided to separate the two carbide seals within the union at such times that no pressurized fluid is being applied to the device. As in the other two patents to Kubala discussed further above, no disclosure is made of the adaption of the union to a Haas or similar mill, and in fact the disclosures of the '879 and '636 Kubala patents teach away from such an application by illustrating the union with a completely different type of equipment.

U.S. Pat. No. 5,743,687 issued on Apr. 28, 1998 to John Ribic et al., titled "Fourth Axis Fixture Quick Change," describes a device including a concentric union for transmitting pneumatic pressure to a wide, short piston and cylinder assembly for controlling axial movement of a drawbar. No coolant passage is provided through the drawbar, as the pneumatic line connects concentrically with the top of the cylinder. Moreover, the piston transmits its force directly to the drawbar, with no means for applying the force peripherally about any intervening structure, such as the Deublin union used with the present invention.

U.S. Pat. No. 5,901,643 issued on May 11, 1999 to John B. Bornhorst, titled "High Pressure Rotary Union For Mechanical Power Press," describes a rotary joint for supplying high pressure hydraulic fluid or the like from a stationary supply to a rotary shaft. The Bornhorst union is considerably simplified relative to the Deublin union and pneumatically actuated, axially operable drawbar release piston of the present invention, as the Bornhorst device is not required to provide any form of axial movement or to accommodate such axial movement along a shaft.

U.S. Pat. No. 6,029,695 issued on Feb. 29, 2000 to Michael Logan, titled "Rotary Union For Transmitting A High Pressure Medium," describes an assembly having a concentric fluid passage therethrough. The Logan union includes a series of circumferential bearings and bleed passages allowing fluid bypassing the internal seals to escape without damaging the bearings. However, the Logan union does not provide any means for transmitting axial motion therethrough, and accordingly does not contain facing seals of carbide or any other material. Moreover, no disclosure is made of the adaption of the Logan union to a Haas or similar mill, nor of any means for transferring axial motion peripherally about the union to avoid damage to facing seals therein, as provided by the present invention.

U.S. Pat. No. 6,109,659 issued on Aug. 29, 2000 to David C. Heidenreich et al., titled "Hydrostatic Rotary Union," describes a fitting having a rotary component captured within a relatively stationary housing, by an end cap threaded onto the housing. The rotary component is axially immovable within the housing, and thus has no facing seals therein. Heidenreich et al. make no disclosure of any adaption of their union with a Haas mill or similar machine, nor do they disclose any additional structure for transmitting axial motion about their union, as provided by the present invention.

Canadian Patent No. 598,285 issued on May 17, 1960 to Hallis N. Stephan, titled "Horizontal Boring, Drilling, And Milling Machine," describes a machine having a tool holder which is secured within a taper in the end of the spindle by a drawbar applying tensile force thereto, as is conventional in the art and generally disclosed in the '248, '801, '488, etc. U.S. Patents discussed further above. As in the case of those U.S. Patents, the '285 Canadian Patent does not disclose any means for supplying coolant axially down the center of the drawbar and tool holder. Also, as no axial coolant is provided, no fluid union or adapter is disclosed, and hence no means is provided for applying a drawbar release force peripherally about such a union, as provided by the present invention.

British Patent Publication No. 859,457 published on Jan. 25, 1961 to Worcester Valve Co., Inc., titled "A Rotary Ball Valve And Union Having A Detachable End Fitting," describes a device serving as a combination of a shutoff valve and union, thereby saving space in the installation. The Worcester Valve device is unrelated to any fluid unions adaptable to the present invention and its installation with a Haas mill or related device, as the Worcester Valve cannot transmit rotary motion thereacross.

Moreover, no means is disclosed for transmitting axial motion around the valve, which means is a part of the present invention.

Finally, Soviet Patent Publication No. 1,579,653 published on Jul. 23, 1990 describes (according to the English abstract and drawings) a hydraulically actuated drawbar release mechanism, wherein hydraulic pressure is applied concentrically to the end of the drawbar and spindle housing. This applies pressure to a concentric piston, which compresses the Belleville washer stack within the spindle to push the drawbar downwardly to release the tool holder. Most of this structure is conventional, and used in the Haas and other mills to which the present invention is applied. However, no disclosure is made in the Soviet Patent Publication of any coolant passage through the drawbar and tool holder, nor of any means for applying drawbar release pressure around the concentric hydraulic fitting, which means are a part of the present invention.

None of the above inventions and patents, taken either singularly or in combination, is seen to describe the instant invention as claimed.

SUMMARY OF THE INVENTION

The present invention comprises a mechanism for releasing or unclamping a tool holder in a machine tool, by releasing the tensile or retractile force on a drawbar which secures the tool holder within the mating internally tapered end of the spindle of the machine. The present invention is particularly well suited for adaption to Haas mills, which conventionally use a relatively large diameter and short stroke plate acting within a pneumatic cylinder to drive a piston downwardly against the top of the drawbar, thereby compressing the drawbar retraction springs to extend the drawbar and allow removal of the tool holder from the opposite end thereof.

Such a conventional mechanism may include an external or internal system for supplying coolant to the tool and workpiece interface, for cooling and lubricating the cutting action for more efficient operation. Where an integral, internal coolant supply system is used, the coolant is piped concentrically downwardly from a connector at the upper end of the drawbar, through the drawbar and tool holder, and to the tool held in the tool holder or sprayed from the tool holder onto the area of the cutting edge of the tool. A non-rotating seal is affixed to the lower end of a non-rotating stem at the upper end of the drawbar, with a rotating seal affixed to the upper end of the rotating drawbar. These two seals are formed of an extremely hard carbide material, in order to resist wear as they bear against one another during machining operations.

The problem with such a conventional system is that when the pneumatic system is actuated to drive the drawbar downwardly for tool holder release, the impact force is applied directly across the two carbide seals. This tends to deform and crack the seals, whereupon they are subject to leaking of coolant during subsequent machining operations. The leaked coolant often migrates past seals and other barriers, and enters the upper bearings for the drawbar. The improper lubrication provided by the coolant causes the bearings to become damaged, thus requiring relatively time consuming and costly repair of the machine. Moreover, the two seals conventionally bear against one another at all times. This is not particularly harmful when coolant is being pumped through the concentric coolant passage of the drawbar, as some coolant will interpose itself between the non-rotating and rotating seals to preclude, or greatly reduce, wear and frictional heating. However, the seals are subject to deformation and other damage due to overheating, when coolant is not used during machining operations.

The present invention responds to the above problems by integrating a Deublin union as the coolant supply union for a Haas mill or similar machine. Such Deublin unions include the non-rotating and rotating seals therein, and include means for separating the two seals when no coolant pressure (and therefore no coolant) is being provided. Moreover, the present invention includes a mechanism for imparting the drawbar release forces peripherally around the Deublin union and its internal seals, thereby precluding the application of force to the seals therein.

Accordingly, it is a principal object of the invention to integrate a Deublin union with the upper end of the drawbar actuation piston of a Haas mill or similar machine, thereby utilizing the seals internal to the union and removing other seals between the drawbar and piston.

It is another object of the invention to provide a drawbar actuation mechanism comprising a pneumatically actuated mechanism disposed peripherally about the Deublin union, thereby precluding application of compressive or impact forces axially through the Deublin union and its internal seals.

It is a further object of the invention to seal the Deublin union to the upper end of the drawbar by means of a positive coupling, thereby precluding leakage of coolant into the spindle bearings of the machine. Still another object of the invention is to provide a pneumatically actuated piston plate for extending the drawbar, with the piston plate having a circumference with a conically tapered section for precluding jamming and sticking of the piston plate within its pneumatic cylinder.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is an unclamping mechanism for a tool holder in a powered machine tool having an internal coolant delivery system for the cutting tool being used with the machine and workpiece being worked by the machine. The present invention serves to preclude compressive forces across the seal inserts conventionally used in such machines for sealing the coolant flow between non-rotating and rotating components of the machine, thereby greatly increasing the life of such inserts. The present invention also allows higher coolant pressures to be used, thereby providing greater coolant flow at the cutting tool and workpiece. In addition, the coolant flow is better sealed, thereby precluding flow of coolant into bearings and subsequent bearing damage.

Figure 1:
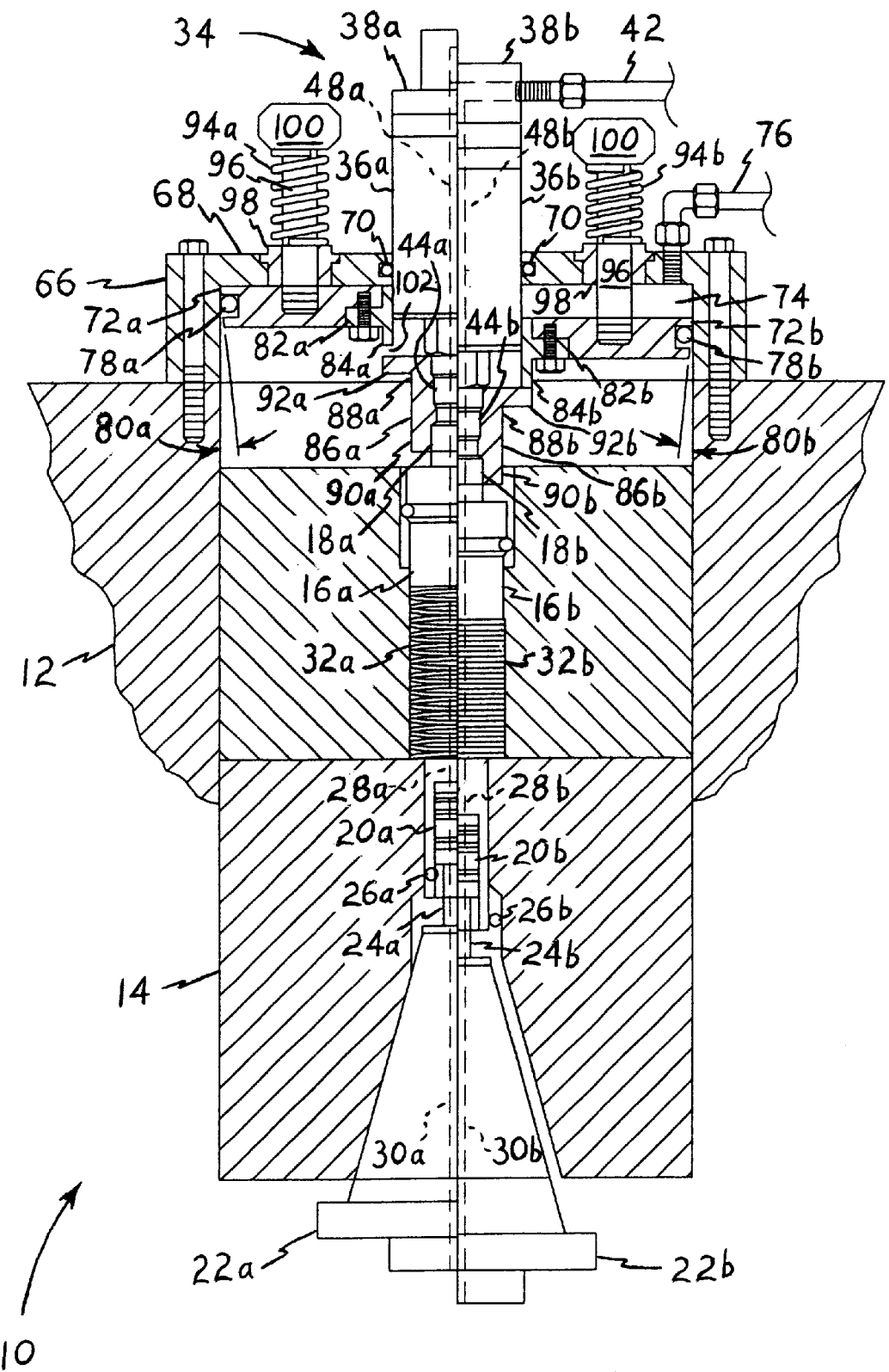
FIG. 1 is a broken away elevation view in section of a powered machine tool incorporating the present tool holder unclamp mechanism, illustrating the elements thereof.

FIG. 1 of the drawings provides a broken away elevation view in section of a powered machine tool 10 incorporating the various elements of the present invention. The machine tool 10 may comprise any powered machine tool to which the present invention may be adapted. However, the present invention is particularly well adapted to machine tools having vertical rotary machining axes, such as a milling machine. More particularly, the present invention is adapted for installation and use with a Haas mill, having a relatively large diameter and short stroke "pancake" pneumatic piston for applying tool holder unclamp forces along the drawbar of the machine.

The machine 10 of FIG. 1 includes a conventional non-rotating body portion 12 having a rotating spindle 14 passing therethrough; the drawing of FIG. 1 is considerably simplified, with many conventional components such as bearings, seals, etc. not shown in order to show more clearly the specific features of the present invention. The various relatively movable components of the present invention are shown in different positions on each side of FIG. 1, with the left side illustrating those components in their normal state wherein the conical tool holder is being held securely within the cooperatingly shaped end of the spindle 14, and the right side showing the components in position for release of the tool holder. The various components which are in different positions on each side of FIG. 1, are designated by appropriate reference numerals with an "a" or "b" letter suffix following, respectively designating the left and right side positions.

The spindle 14 includes a drawbar 16a, 16b disposed axially and concentrically therethrough, with the drawbar 16a, 16b having a first end 18a, 18b connected to a coolant connector or union (described further below), and an opposite second end 20a, 20b providing releasable connection for holding a tool holder 22a, 22b in place within the conically tapered end of the spindle 14. The tool holder 22a, 22b has a pull stud 24a, 24b extending from its narrow, conical apex end, which engages a mating inner socket formed within the second end 20a, 20b of the drawbar 16a, 16b.

When the tool holder is drawn upwardly within its mating conical receptacle within the spindle 14, it is held in place by a series of locking balls 26a (one of which is shown in the left side of FIG. 1), which are forced inwardly by the taper of the lower end of the drawbar passage through the spindle 14. When the drawbar 16a, 16b is lowered, the lock balls 26b (one of which is shown in the right side of FIG. 1) drop downwardly and move outwardly into the wider area of the drawbar passage, thereby providing clearance for the flange of the tool holder pull stud 24a, 24b to pass from its secured position for removal from the spindle 14. The above description of the lock ball retaining means for the tool holder 22a, 22b within the end of the spindle 14 is conventional with various powered machine tools, particularly the Haas milling machine to which the present invention is particularly applied.

The drawbar 16a, 16b includes a coolant passage 28a, 28b formed concentrically and axially therethrough, for passing coolant therethrough from a conventional coolant supply and pump (not shown) to the cutting tool and workpiece (not shown) during machining operations. The coolant passage 28a, 28b communicates with a coolant passage 30a, 30b formed axially and concentrically through the tool holder 22a, 22b to form an essentially unbroken coolant passage through the spindle 14 of the machine 10.

The drawbar 16a, 16b is normally held in a retracted position, i.e., as in the drawbar left side 16a, by a series of alternatingly stacked Bellville washers 32a, as is conventional in the art; other spring means may be used as desired. Bellville washers are formed with a curvature thereacross, and form a compression spring when stacked with their convex surfaces in alternating orientations. The pressure imposed by the stacked washers 16a on the left side of FIG. 1 holds the drawbar 16a in a retracted position, thereby securing the tool holder 22a within the spindle 14 by the locking ball means 26a described generally further above. When the tool holder 22a is to be removed from the spindle 14, the drawbar 16a is driven downwardly to the position shown as 16b, thereby compressing the Bellville washers generally as shown with washers 32b on the right side of FIG. 1. This extends the tool holder to the position shown as 22b in FIG. 1, and releases the lock ball as shown in 26b, thereby allowing the tool holder to be removed from the spindle 14 for replacement of the tool insert, installing a different tool holder, etc. as desired.

Figure 2:
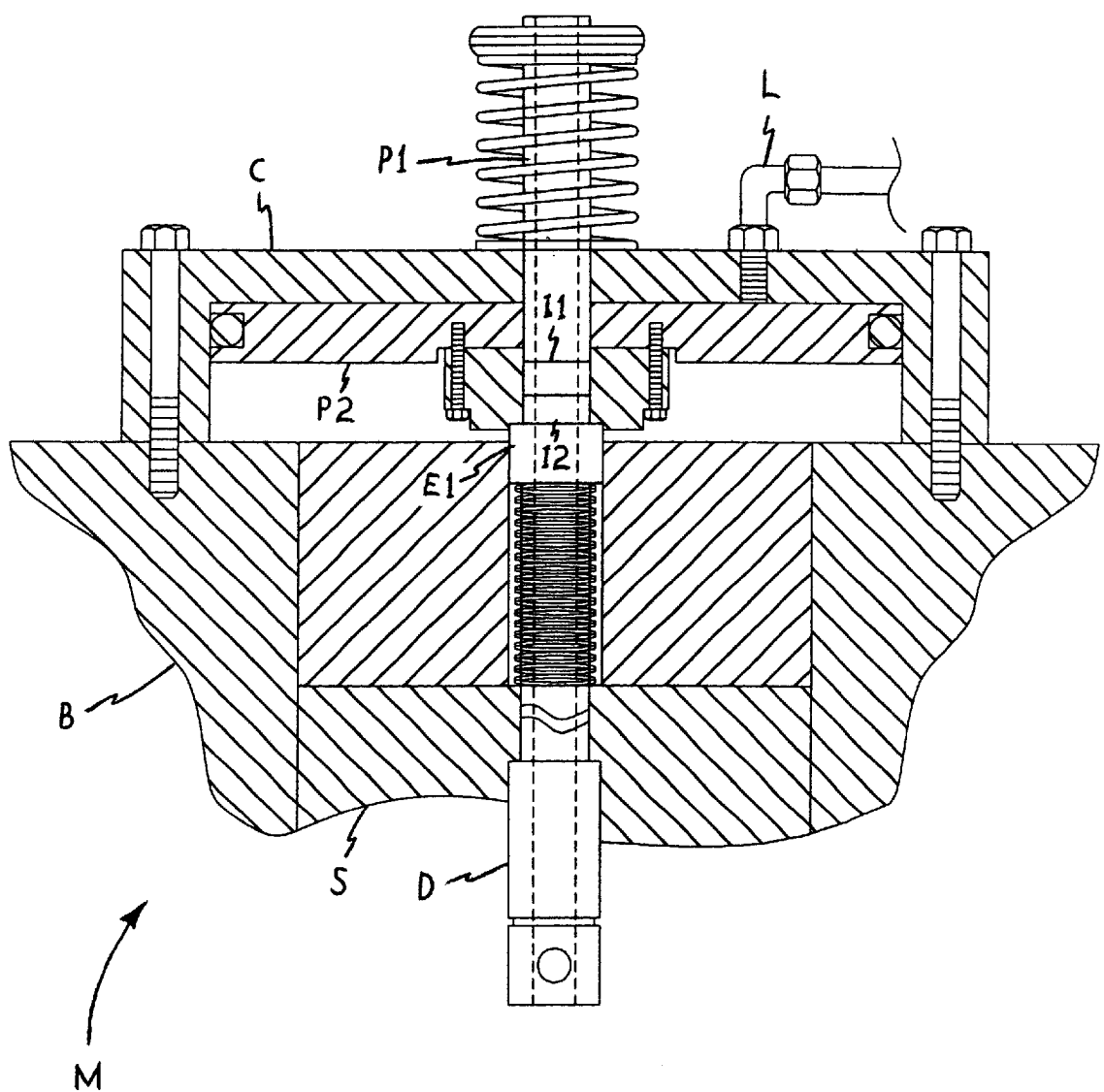
FIG. 2 is a broken away elevation view in section of a prior art machine tool, illustrating the coolant and coolant seal systems thereof.

FIG. 2 of the drawings provides a broken away elevation view in section of a conventional prior art machine M, having stationary body B with a rotating spindle S disposed therethrough. A drawbar D extends axially and concentrically through the spindle S. The upper end E1 of the drawbar D is driven downwardly by a pneumatically actuated tool change piston P1 which impacts the first end E1 of the drawbar D through a relatively stationary carbide seal insert I1 secured to the lower end of the piston P1 and a rotating seal insert I2 secured to the first end E1 of the drawbar D. The piston P1 is in turn driven downwardly by a relatively large diameter, short stroke plate P2 attached thereto, which is housed within a cylinder C disposed axially and concentrically above the upper end E1 of the drawbar D and the spindle S. Air pressure is selectively applied within the cylinder C by means of a pneumatic line L, which drives the plate P2 downwardly to drive the piston P1 downwardly against the first end E1 of the drawbar D, across the two inserts I1 and I2.

The problems of cracking and leaking of the inserts I1 and I2 due to these tool change impact forces, and operating the machine M without coolant, have been noted further above. The present invention provides a solution to these problems by applying the tool change impact forces to the drawbar 16a, 16b around the seals disposed above the first end 18a, 18b of the drawbar 16a, 16b.

Figure 3:
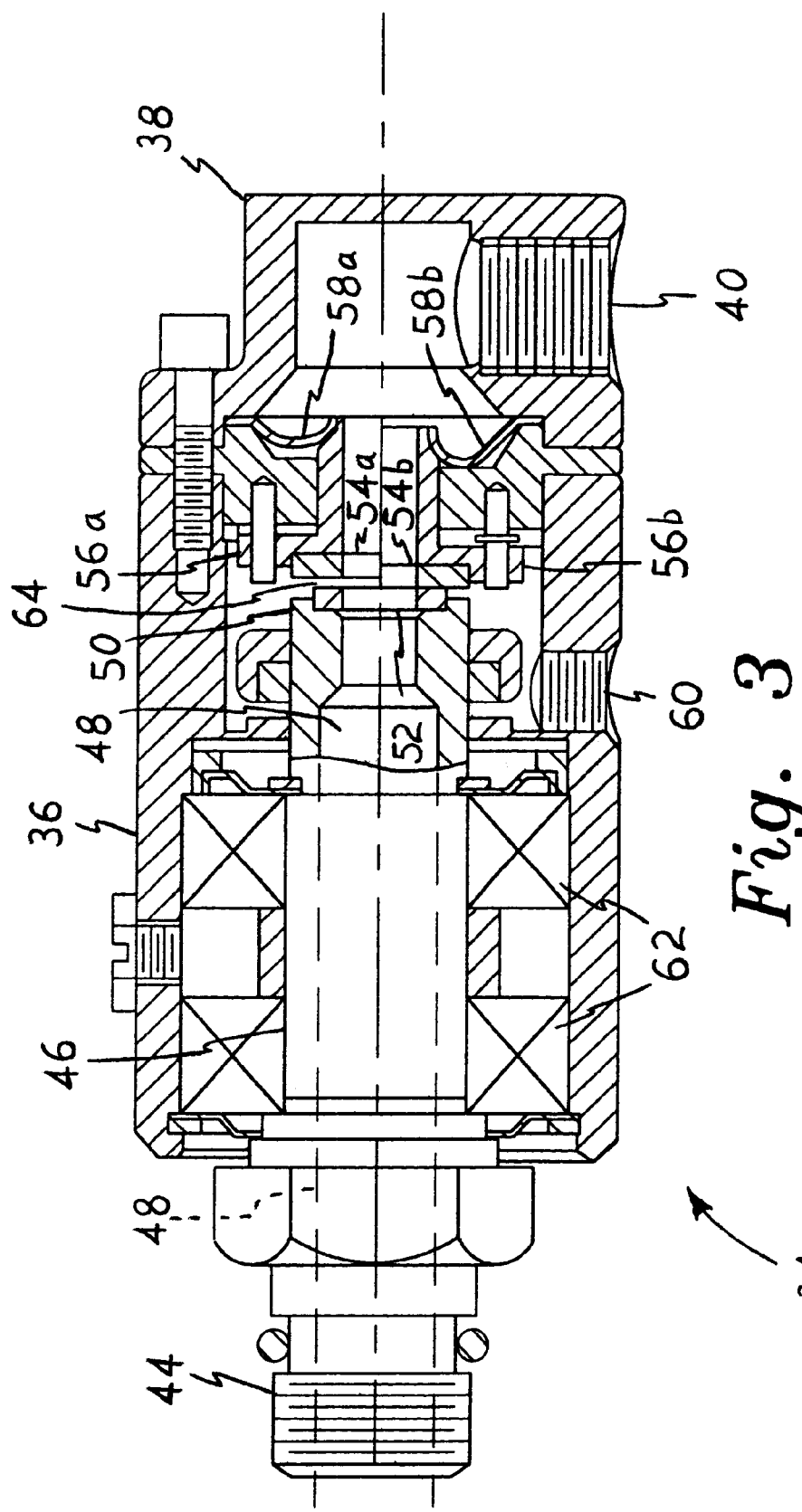
FIG. 3 is a front elevation in section of a conventional Deublin union of the prior art, illustrating its internal structure.

Rather than placing the two seal inserts in constant contact with one another, as in the prior art machine M of FIG. 2, the present invention makes use of a union connector 34 of the prior art installed in combination with the machine 10 of FIG. 1. FIG. 3 of the drawings provides an elevation view in section of the prior art union 34, known as a "Deublin union," which is used with the present invention as a tool holder unclamping actuator. The tool holder unclamp union 34 of FIG. 3 essentially comprises a non-rotating housing 36 (36a, 36b in FIG. 1) including a non-rotating first end 38 (38a, 38b in FIG. 1), with the first end 38 having a fluid inlet port 40 therein for connecting a fluid coolant line 42 immovably thereto (shown in FIG. 1). The opposite second end 44 (44a, 44b in FIG. 1) of the union 34 rotates relative to the first end 38 and housing 36, as it is immovably affixed to the first end 18a/18b of the drawbar 16a/16b, shown in FIG. 1.

The rotating second end 44 of the union 34 is an extension of the concentric coolant passage shaft 46 disposed within the union housing 36. This shaft 46 includes a concentric coolant passage 48 formed axially therethrough, and communicating with the coolant passage 28a, 28b of the drawbar 16a, 16b by means of the shaft end 44 connection with the first end 18a, 18b of the drawbar 16a, 16b. The opposite first end 50 of the rotating coolant passage shaft 46 of the union 34 includes a first seal insert 52 affixed thereto, while a mating but rotationally stationary second seal insert 54a, 54b is affixed to a stationary seal holder 56a, 56b, which is in turn supported by a flexible, axially movable diaphragm 58a, 58b.

When coolant fluid is provided under pressure through the union 34, the diaphragm flexes toward the first seal 52, moving the rotationally stationary seal holder and second seal toward the first seal 52, with the second seal bearing concentrically against the first seal 52 as shown by the positions of the diaphragm 58b, second seal holder 56b, and second seal 54b in the lower half of the FIG. 3 drawing. This seats the two seals securely against one another, to provide a reasonably leakproof fitting between the relatively stationary and rotating components of the coolant fluid delivery system. Any leakage which may occur, particularly during initial pressurizing and relieving of pressure in the system, escapes via an external relief passage 60 above the bearings 62, thus precluding damage to seals and bearings in the machine.

However, when coolant pressure is no longer applied, the diaphragm returns to its at rest position, shown by the diaphragm 58a in the upper half of FIG. 3. This draws the second seal holder and its second seal insert away from the first seal 52, as shown by the seal holder 56a and second seal insert 54a positions in the upper portion of FIG. 3. This results in a gap 64 between the two seals 52 and 54a, as shown in the upper half of FIG. 3. Thus, the two seals do not bear against one another unless coolant fluid is being applied through the union 34 under pressure, to flex the diaphragm toward the first seal and cause the second seal to bear against the first seal. The incorporation of such a Deublin union 34 with the machine 10, results in greatly reduced wear on the seals between the rotationally stationary and rotating components.

The present tool holder unclamp mechanism also includes means for selectively imparting pressure to the first end 18a, 18b of the drawbar 16a, 16b and externally to the union 34 for extending the second end 20a, 20b of the drawbar 16a, 16b from the spindle 14, for removing the tool holder 22a, 22b from the second end 20a, 20b of the drawbar 16a, 16b and precluding application of force to the first seal 52 and second seal 54a, 54b of the union 34. This is accomplished as shown in FIG. 1 by a pneumatic cylinder 66 disposed atop the machine tool body 12, axially concentric with the spindle 14 and drawbar 16a, 16b. The cylinder 66 includes a fixed cylinder head 68, with the cylinder head 68 having a concentric passage therethrough which closely fits about the circumference of the outer housing 36a, 36b of the Deublin union 34. The union 34 isaxially movable through the cylinder head 68, with a pneumatic seal provided by an O-ring 70 or the like.

A relatively large diameter, short stroke pneumatically actuated plate 72a, 72b is installed within the cylinder 66, with the cylinder 66, cylinder head 68, and pneumatic plate 72a, 72b defining a pneumatic chamber 74 within the cylinder 66. A pneumatic pressure supply line 76 is installed through the cylinder head 68 to provide air (or other gas) under pressure to activate the pneumatic plate 72a, 72b within the cylinder 66. The plate 72a, 72b is sealed pneumatically by a peripheral O-ring 78a, 78b or the like, and includes an inwardly conically tapered periphery (indicated by the angles 80a, 80b) to preclude cocking or jamming of the plate 72a, 72b within the cylinder 66 during operation.

The pneumatic plate is immovably affixed to the housing 36a, 36b by a concentric collar 82a, 82b which surrounds and is sealed to the housing 36a, 36b of the union 34. The collar 82a, 82b has a cylindrical collar wall and contact edge 84a, 84b depending therefrom. A hollow, generally cylindrical coupling 86a, 86b has a first end 88a, 88b affixed (threaded, etc.) to the second end 44a, 44b of the union 34, with an opposite second end 90a, 90b affixed (e. g., threaded) to the first end 18a, 18b of the drawbar 16a, 16b. The coupling has a circumferential flange 92a, 92b extending outwardly from the first end 88a, 88b thereof, with the flange 92a, 92b disposed concentrically with the depending collar wall and contact edge 84a, 84b of the collar 82a, 82b.

The pneumatic plate is held in a normally retracted position adjacent the cylinder head 68 by a series of radially disposed coil compression springs 94a, 94b and corresponding bolts or pins 96 sliding in corresponding cylindrical guides 98 in the cylinder head 68. The lower pin ends thread into the pneumatic plate 72a, 72b. The springs 94a, 94b are captured on the pins 96 by the larger diameter retaining bolt or pin heads or ends 100, with the springs 94a, 94b urging the pins 96 away from the cylinder head 68, thus pulling the pneumatic plate toward the inside of the cylinder head 68, as shown by the plate 72a position in the left side of FIG. 1. The central stack of Bellville washers act as a compression spring to hold the drawbar, and thus the union to which it is secured by the coupling, in a retracted position, as in the drawbar 16a, coupling 86a, and union 38a positions of the left side of FIG. 1.

When no pneumatic pressure is applied within the cylinder 66 and the pneumatic plate is retracted to its position 72a as shown in the left side of FIG. 1, there will normally be a slight clearance gap 102 between the contact edge 84a of the collar 82a and the flange 92a of the coupling 86a (this gap 102 may be exaggerated in FIG. 1, for clarity). This ensures that no pressure is applied to the drawbar 16a in its normally retracted state, in order to assure that the Bellville washer spring stack 32a holds the drawbar 16a in a firmly retracted state to hold the tool holder 22a securely within the end of the spindle 14.

It will be seen that the positions of all components in the left side of FIG. 1 represent a normal operating configuration, where the machine 10 may be operated with the tool holder 22a being held securely within the lower end of the spindle 14. This is the case whether coolant is being provided through the union 34 and drawbar and tool holder coolant passages 28a and 30a, or not. The lack of coolant pressure within the system does not affect the relative positions of the union 34, drawbar, and components between the union and drawbar during operation. Application of coolant pressure serves only to distend the internal diaphragm within the union 34 to drive the second seal adjacent the first seal, as shown by the diaphragm 58b, second seal 54b, and first seal 52 positions in the right side of the section view of the union 34 in FIG. 2 of the drawings.

However, when it is desired to remove the tool holder from the drawbar, pneumatic pressure is applied to the pneumatic cylinder 66 by means of the pneumatic line 76 communicating internally therewith. This pressure drives the pneumatic plate downwardly, as shown in the plate position 72b of FIG. 1. As the plate is driven downwardly, the attached collar is also driven downwardly to contact the coupling which connects the second end of the union 34 to the first end of the drawbar. As the second end of the union 34 is axially fixed within the union 34, the union 34 is thus also drawn into the pneumatic cylinder 66. This configuration is illustrated by the positions of the plate 72b, collar 82b, coupling 86b, drawbar 16b, union second end 44b, and drawbar first end 18b in the right side of FIG. 1.

It will be seen that the drawbar extension forces act around the union 34, rather than through the union and across its internal seals. Instead, the pneumatic plate, collar, and coupling all act to transmit the drawbar extension forces externally and peripherally to the union, with no pneumatic compressive forces acting internally through the union. Thus, no compressive forces are applied to the non-rotating and rotating drawbar seals during tool holder changeover operations using the present invention, thereby greatly prolonging the life of the seals and producing greater economies in terms of reduced time and costs for maintenance and repairs of the machine.

In summary, the present tool holder unclamp mechanism provides significant reduction in wear and tear upon coolant fluid seals and related components in powered machine tools having internal machining coolant passages with carbide seals. The combination of a Deublin union, with its internal seals, and mechanism for applying drawbar compressive forces around the union, result in greatly reduced stresses on the seals within the union and accordingly reduced damage thereto during operations. Moreover, the inclusion of a Deublin union or similar device in the present invention, provides relief for coolant which escapes peripherally from between the two seals, with escaped coolant being returned to a coolant tank or otherwise routed away from the bearings and seals of the machine. The present invention thus greatly reduces downtime for maintenance and repair of coolant seals, bearings, and other related components of the machine, thus reducing operating expenses for parts and labor and allowing greater productivity from the machine as well. Moreover, the use of a Deublin union or similar device with the present invention, permits greatly increased coolant pressures to be used due to the better sealing properties of the Deublin union, thereby increasing coolant flow and permitting more rapid machining operations. Accordingly, the present invention will pay for itself in short order in increased productivity and reduced downtime and maintenance costs.

It is to be understood that the present invention is not limited to the embodiment described above, but encompasses any and all embodiments within the scope of the following claims.

I claim:

1. A powered machine tool and tool holder unclamp mechanism therefor, comprising in combination:
    a non-rotating machine tool body;
    a rotating machine tool spindle disposed through said machine tool body;
    a rotating drawbar axially concentrically disposed through said machine tool spindle;
    said drawbar having a first end, a second end opposite said first end, and a concentric axial coolant passage therethrough;
    a fluid coolant line for selectively delivering coolant to said coolant passage of said drawbar;
    a selectively installable tool holder disposed at said second end of said drawbar;
    spring means urging said drawbar to a retracted position for securing said tool holder to said spindle;
    a tool holder unclamp union having a non-rotating first end and housing, a rotating second end opposite said first end thereof, and an axial coolant passage disposed concentrically therethrough from said first end to said second end thereof;
    said first end of said union being immovably affixed to said fluid coolant line;
    said second end of said union being immovably affixed to said first end of said drawbar;
    a non-rotating first seal and a rotating second seal disposed concentrically within said union, with said first seal and said second seal bearing against one another for sealing coolant flow within said coolant passage of said union when coolant pressure is applied therethrough; and
    means for selectively imparting pressure to said first end of said drawbar and externally to said union in order to extend said second end of said drawbar from said spindle, to remove said tool holder from said second end of said drawbar and to preclude application of force to said first seal and said second seal of said union.

2. The powered machine tool and tool holder unclamp mechanism combination according to claim 1, wherein said means for selectively imparting pressure to said first end of said drawbar comprises:
    a pneumatic cylinder disposed atop said machine tool body, concentrically surrounding and pneumatically sealed to said union;
    a pneumatically actuated plate disposed within said pneumatic cylinder, concentrically surrounding and immovably affixed to said housing of said union;
    said pneumatic cylinder further including a cylinder head, with said pneumatic cylinder, said cylinder head, and said pneumatically actuated plate defining a pneumatic pressure chamber therebetween;
    a pneumatic supply line secured through said pneumatic cylinder and communicating pneumatically with said pneumatic pressure chamber; and
    means for selectively imparting pressure from said pneumatically actuated plate to said first end of said drawbar and externally relative to said union in order to extend said second end of said drawbar from said spindle, and to remove said tool holder from said second end of said drawbar.

3. The powered machine tool and tool holder unclamp mechanism combination according to claim 2, wherein said pneumatically actuated plate further includes a periphery having a conical section tapering inwardly away from said cylinder head, for precluding jamming and cocking of said pneumatically actuated plate within said pneumatic cylinder when pneumatic pressure is applied to said pneumatic cylinder for advancing said pneumatically actuated plate therein.

4. The powered machine tool and tool holder unclamp mechanism combination according to claim 2, wherein said means for selectively imparting pressure from said pneumatically actuated plate to said first end of said drawbar comprises:
    a collar concentrically affixed to said pneumatic plate, sealed to and surrounding said housing of said union; a cylindrical collar wall having a contact edge, depending from said collar;
    a hollow coupling having a first end affixed to said second end of said union, and a second end affixed to said first end of said drawbar;
    a circumferential flange extending radially from said first end of said coupling, for selectively engaging said contact edge of said collar wall of said collar when said pneumatically actuated plate is operated; and
    bias means for urging said pneumatically actuated plate to a normally retracted position;
    said contact edge of said collar wall of said collar and said circumferential flange of said coupling defining a clearance gap therebetween when said pneumatically actuated plate is retracted within said pneumatic cylinder, whereby;

said pneumatically actuated plate travels within said pneumatic cylinder toward said second end of said union when pneumatic pressure is applied to said pneumatic pressure chamber, with said contact edge of said collar wall of said collar contacting said flange of said first end of said coupling, thereby pushing said coupling and said drawbar away from said housing of said union and extending said drawbar for releasing said tool holder therefrom.

5. The powered machine tool and tool holder unclamp mechanism combination according to claim 4, wherein said bias means comprises:

a plurality of radially disposed spring means for urging said pneumatically actuated plate toward said cylinder head of said pneumatic cylinder.

6. The powered machine tool and tool holder unclamp mechanism combination according to claim 5, wherein each of said plurality of radially disposed spring means comprises:

a generally cylindrical spring pin guide disposed through said pneumatic cylinder head;

a spring pin slidingly disposed through said spring pin guide;

said spring pin having an external spring retainer end and a threaded plate engagement end opposite said spring retainer end;

said spring pin being threaded into said pneumatically actuated plate; and a coil compression spring disposed about said spring pin, urging said spring pin outwardly from said spring pin guide and said pneumatic cylinder head, thereby drawing said pneumatically actuated plate toward said pneumatic cylinder head and drawing said drawbar and said tool holder toward a retracted position in said spindle;

wherein said plurality of spring means are radially disposed about said cylinder head.

7. The powered machine tool and tool holder unclamp mechanism combination according to claim 1, wherein said powered machine tool has a vertical rotary machining axis.

8. The powered machine tool and tool holder unclamp mechanism combination according to claim 1, wherein said powered machine tool is a milling machine.

9. In a powered machine tool having a rotating spindle with a rotating drawbar axially concentrically disposed therethrough, the drawbar having a first end, a second end opposite said first end, and a concentric axial coolant passage therethrough, and a fluid coolant line for selectively delivering coolant to the coolant passage of the drawbar, a selectively installable tool holder disposed at the second end of the drawbar, and spring means urging the drawbar to a retracted position for securing the tool holder thereto, a tool holder unclamp mechanism, comprising:

a union having a non-rotating first end and housing, a rotating second end opposite said first end thereof, and an axial coolant passage disposed concentrically therethrough from said first end to said second end thereof;

said first end of said union being immovably affixed to the fluid coolant line;

said second end of said union being immovably affixed to the first end of the drawbar;

a non-rotating first seal and a rotating second seal disposed concentrically within said union, with said first seal and said second seal bearing against one another for sealing coolant flow within said coolant passage of said union when coolant pressure is applied therethrough; and means for selectively imparting pressure to the first end of the drawbar and externally to said union in order to extend the drawbar from the spindle, to remove the tool holder from the second end of the drawbar and to preclude application of force to said first seal and said second seal of said union.

10. The tool holder unclamp mechanism according to claim 9, wherein said means for selectively imparting pressure to the first end of the drawbar comprises:

a pneumatic cylinder disposed atop the machine tool, concentrically surrounding and pneumatically sealed to said union;

a pneumatically actuated plate disposed within said pneumatic cylinder, concentrically surrounding and immovably affixed to said housing of said union;

said pneumatic cylinder further including a cylinder head, with said pneumatic cylinder, said cylinder head, and said pneumatically actuated plate defining a pneumatic pressure chamber therebetween;

a pneumatic supply line secured through said pneumatic cylinder and communicating pneumatically with said pneumatic pressure chamber; and means for selectively imparting pressure from said pneumatically actuated plate to the first end of the drawbar and externally relative to said union in order to extend the second end of the drawbar from the spindle and to remove the tool holder from the second end of the drawbar.

11. The tool holder unclamp mechanism according to claim 10, wherein said pneumatically actuated plate further includes a periphery having a conical section tapering inwardly away from said cylinder head, for precluding jamming and cocking of said pneumatically actuated plate within said pneumatic cylinder when pneumatic pressure is applied to said pneumatic cylinder for advancing said pneumatically actuated plate therein.

12. The tool holder unclamp mechanism according to claim 10, wherein said means for selectively imparting pressure from said pneumatically actuated plate to the first end of the drawbar, comprises:

a collar concentrically affixed to said pneumatic plate, sealed to and surrounding said housing of said union;

a cylindrical collar wall having a contact edge, depending from said collar;

a hollow coupling having a first end affixed to said second end of said union, and a second end affixed to said first end of said drawbar;

a circumferential flange extending radially from said first end of said coupling, for selectively engaging said contact edge of said collar wall of said collar when said pneumatically actuated plate is operated; and bias means for urging said pneumatically actuated plate, the drawbar, and the tool holder to a normally retracted position;

said contact edge of said collar wall of said collar and said circumferential flange of said coupling defining a clearance gap therebetween when said pneumatically actuated plate is retracted within said pneumatic cylinder, whereby;

said pneumatically actuated plate travels within said pneumatic cylinder toward said second end of said union when pneumatic pressure is applied to said pneumatic pressure chamber, with said contact edge of said collar wall of said collar contacting said flange of said first end of said coupling, thereby pushing said coupling and the drawbar away from said housing of said union and extending the drawbar for releasing the tool holder therefrom.

13. The tool holder unclamp mechanism according to claim 12, wherein said bias means comprises:

a plurality of radially disposed spring means for urging said pneumatically actuated plate toward said cylinder head of said pneumatic cylinder.

14. The tool holder unclamp mechanism according to claim 13, wherein each of said plurality of radially disposed spring means comprises:

a generally cylindrical spring pin guide disposed through said pneumatic cylinder head;

a spring pin slidingly disposed through said spring pin guide;

said spring pin having an external spring retainer end and a threaded plate engagement end opposite said spring retainer end;

said spring pin being threaded into said pneumatically actuated plate; and a coil compression spring disposed about said spring pin, urging said spring pin outwardly from said spring pin guide and said pneumatic cylinder head, thereby drawing said pneumatically actuated plate toward said pneumatic cylinder head and drawing the drawbar and tool holder toward a retracted position in the spindle.

15. In a powered machine tool having a rotating spindle with a rotating drawbar axially concentrically disposed therethrough, the drawbar having a first end, a second end opposite said first end, and a concentric axial coolant passage therethrough, a fluid coolant line selectively delivering coolant to the coolant passage of the drawbar, a selectively installable tool holder disposed at the second end of the drawbar, and spring means urging the drawbar to a retracted position for securing the tool holder thereto, a tool holder unclamp mechanism, comprising:

fluid connection means for connecting the first end of the drawbar and the fluid coolant line;

a pneumatic cylinder disposed atop the machine tool, concentrically surrounding and pneumatically sealed to said fluid connection means;

a pneumatically actuated plate disposed within said pneumatic cylinder, concentrically surrounding and immovably affixed to a portion of said fluid connection means;

said pneumatic cylinder further including a cylinder head, with said pneumatic cylinder, said cylinder head, and said pneumatically actuated plate defining a pneumatic pressure chamber therebetween;

a pneumatic supply line secured through said pneumatic cylinder and communicating pneumatically with said pneumatic pressure chamber;

a collar concentrically affixed to said pneumatic plate, sealed to and surrounding said fluid connection means;

a cylindrical collar wall having a contact edge, depending from said collar;

a hollow coupling having a first end affixed to and end of said fluid connection means, and a second end affixed to said first end of said drawbar;

a circumferential flange extending radially from said first end of said coupling, for selectively engaging said contact edge of said collar wall of said collar when said pneumatically actuated plate is operated;

means for urging said pneumatically actuated plate, the drawbar, and the tool holder to a normally retracted position; and said contact edge of said collar wall of said collar and said circumferential flange of said coupling defining a clearance gap therebetween when said pneumatically actuated plate is retracted within said pneumatic cylinder, whereby;

said pneumatically actuated plate travels within said pneumatic cylinder toward said end of said fluid connection means when pneumatic pressure is applied to said pneumatic pressure chamber, with said contact edge of said collar wall of said collar contacting said flange of said first end of said coupling, thereby pushing said coupling and the drawbar toward said end of said fluid connection means and extending the drawbar for releasing the tool holder therefrom.

16. The tool holder unclamp mechanism according to claim 15, wherein:

said fluid connection means comprises a union defining a coolant passage and having a non-rotating first end and housing, and having a rotating second end opposite said first end thereof;

the fluid coolant line being connected to said first end of said union;

said second end of said union being immovably affixed to the first end of the drawbar; and a non-rotating first seal and a rotating second seal disposed concentrically within said union, with said first seal and said second seal bearing against one another for sealing coolant flow within said coolant passage of said union when coolant pressure is applied therethrough.

17. The tool holder unclamp mechanism according to claim 15, wherein said pneumatically actuated plate further includes a periphery having a conical section tapering inwardly away from said cylinder head, for precluding jamming or cocking of said pneumatically actuated plate within said pneumatic cylinder when pneumatic pressure is applied to said pneumatic cylinder for advancing said pneumatically actuated plate therein.

18. The tool holder unclamp mechanism according to claim 15, wherein said means for urging said pneumatically actuated plate, the drawbar, and the tool holder to a normally retracted position comprises:

a plurality of radially disposed spring means urging said pneumatically actuated plate toward said cylinder head of said pneumatic cylinder.

19. The tool holder unclamp mechanism according to claim 18, wherein each of said plurality of radially disposed spring means comprises:

a generally cylindrical spring pin guide disposed through said pneumatic cylinder head;

a spring pin slidingly disposed through said spring pin guide;

said spring pin having an external spring retainer end and a threaded plate engagement end opposite said spring retainer end;

said spring pin being threaded into said pneumatically actuated plate; and a coil compression spring disposed about said spring pin, urging said spring pin outwardly from said spring pin guide and said pneumatic cylinder head, thereby drawing said pneumatically actuated plate toward said pneumatic cylinder head and drawing the drawbar and tool holder toward a retracted position in the spindle.

* * * * *